US010988327B1

(12) United States Patent
Layne et al.

(10) Patent No.: US 10,988,327 B1
(45) Date of Patent: Apr. 27, 2021

(54) SORTATION SYSTEM AND RELATED METHODS

(71) Applicant: SPAN TECH LLC, Glasgow, KY (US)

(72) Inventors: James L. Layne, Bowling Green, KY (US); Stephen C. Fye, Glasgow, KY (US); Scott Dayton Barbour, Glasgow, KY (US); Aaron M. Cotton, Glasgow, KY (US)

(73) Assignee: SPAN TECH LLC, Glasgow, KY (US)

( * ) Notice: Subject to any disclaimer, the term of this patent is extended or adjusted under 35 U.S.C. 154(b) by 0 days.

(21) Appl. No.: 16/504,444

(22) Filed: Jul. 8, 2019

Related U.S. Application Data

(60) Provisional application No. 62/694,678, filed on Jul. 6, 2018.

(51) Int. Cl.
| | |
|---|---|
| *B65G 47/64* | (2006.01) |
| *B65G 47/51* | (2006.01) |
| *B65G 47/57* | (2006.01) |
| *B65G 47/26* | (2006.01) |
| *B65G 47/24* | (2006.01) |
| *B65G 59/12* | (2006.01) |

(52) U.S. Cl.
CPC .......... *B65G 47/647* (2013.01); *B65G 47/24* (2013.01); *B65G 47/268* (2013.01); *B65G 47/5181* (2013.01); *B65G 47/57* (2013.01); *B65G 59/12* (2013.01)

(58) Field of Classification Search
CPC .... B65G 47/647; B65G 47/24; B65G 47/268; B65G 47/5181; B65G 47/57; B65G 47/514; B65G 47/31; B65G 47/28; B65G 59/12

USPC ........ 198/457.06, 459.7, 458, 370.08, 461.2, 198/461.3

See application file for complete search history.

(56) References Cited

U.S. PATENT DOCUMENTS

| | | | | |
|---|---|---|---|---|
| 2,346,583 | A * | 4/1944 | Jackson | B07C 5/124 209/531 |
| 3,710,919 | A * | 1/1973 | Maters | B65G 47/682 198/453 |
| 3,908,333 | A * | 9/1975 | Cavanna | B65B 35/24 53/51 |
| 4,136,780 | A | 1/1979 | Hunter et al. | |
| 4,284,186 | A | 8/1981 | Brouwer | |
| 4,623,059 | A * | 11/1986 | Agnew | B65G 47/682 198/452 |
| 4,751,060 | A * | 6/1988 | Kratochwill | B01D 11/023 196/14.52 |
| 5,038,915 | A * | 8/1991 | Delsanto | B65B 57/16 198/419.3 |
| 5,074,400 | A * | 12/1991 | Focke | B65B 35/58 198/415 |
| 5,240,101 | A | 8/1993 | LeMay et al. | |
| 5,460,271 | A * | 10/1995 | Kenny | B07C 5/02 198/453 |

(Continued)

*Primary Examiner* — Mark A Deuble
(74) *Attorney, Agent, or Firm* — King & Schickli, PLLC

(57) ABSTRACT

A conveyor system for sorting articles being conveyed in a conveying direction. A first conveyor section includes a plurality of inclined conveyors for de-stacking articles. A second conveyor section includes at least one indexing conveyor for spacing a first group of articles from upstream articles. A third conveyor section includes a chicane conveying path for forming the first group of articles into a single row generally aligned with the conveying direction. Related methods are also disclosed.

22 Claims, 3 Drawing Sheets

(56) References Cited

U.S. PATENT DOCUMENTS

Figure 1:
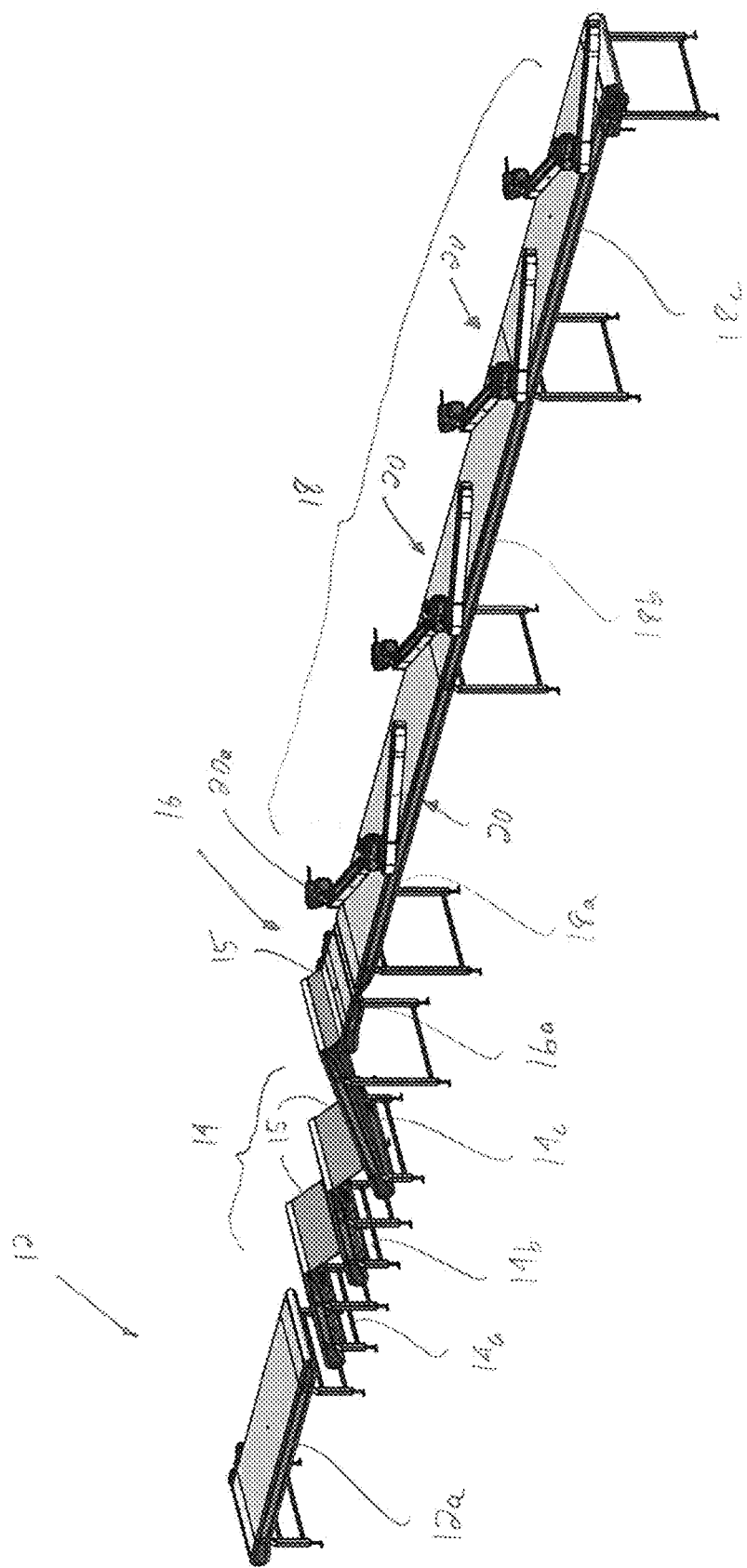

| | | | |
|---|---|---|---|
| 5,497,871 A * | 3/1996 | Ciolkevich | B65G 47/1471 198/443 |
| 5,531,312 A | 7/1996 | Dickey | |
| 5,638,938 A | 6/1997 | Lazzarotti et al. | |
| 5,641,052 A | 6/1997 | Lazzarotti et al. | |
| 5,655,643 A * | 8/1997 | Bonnet | B65G 47/766 198/370.08 |
| 5,740,901 A | 4/1998 | Lazzarotti et al. | |
| 5,746,301 A | 5/1998 | Maier | |
| 5,772,006 A | 6/1998 | Axmann | |
| 5,788,053 A * | 8/1998 | Glawitsch | B65G 47/1492 198/396 |
| 5,918,723 A | 7/1999 | Schuitema | |
| 5,947,473 A | 9/1999 | Spitzer | |
| 5,950,800 A | 9/1999 | Terrell | |
| 6,056,107 A | 5/2000 | Schuitema | |
| 6,129,199 A | 10/2000 | Gretener et al. | |
| 6,253,905 B1 | 7/2001 | Pelka | |
| 6,253,910 B1 | 7/2001 | Axmann | |
| 6,259,967 B1 | 7/2001 | Hartlepp | |
| 6,269,933 B1 | 8/2001 | Schuitema | |
| 6,273,268 B1 | 8/2001 | Axmann | |
| 6,390,277 B2 | 5/2002 | Pelka | |
| 6,401,936 B1 | 6/2002 | Isaacs et al. | |
| 6,471,044 B1 | 10/2002 | Isaacs et al. | |
| 6,484,886 B1 | 11/2002 | Isaacs et al. | |
| 6,491,154 B2 | 12/2002 | Ydoate et al. | |
| 6,609,607 B2 | 8/2003 | Woltjer et al. | |
| 6,622,847 B2 | 9/2003 | Schuitema et al. | |
| 6,629,018 B2 | 9/2003 | Mondie et al. | |
| 6,659,264 B2 | 12/2003 | Pelka | |
| 6,758,323 B2 | 7/2004 | Costanzo | |
| 6,811,035 B2 | 11/2004 | Axmann | |
| 6,837,362 B2 | 1/2005 | van Wijngaarden et al. | |
| 6,944,324 B2 | 9/2005 | Tran et al. | |
| 7,114,613 B2 | 10/2006 | Brouwer et al. | |
| 7,303,059 B2 | 12/2007 | Pugh | |
| 7,311,191 B2 | 12/2007 | Bahr | |
| 8,301,298 B2 | 10/2012 | Bisse | |
| 8,528,742 B2 | 9/2013 | Wargo et al. | |
| 8,590,692 B2 | 11/2013 | Wooldridge et al. | |
| 8,616,361 B1 * | 12/2013 | Shankarbabu | B65G 47/766 198/370.07 |
| 9,038,810 B2 | 5/2015 | Schroader | |
| 9,085,422 B2 | 7/2015 | Cristoforetti | |
| 9,199,281 B2 | 12/2015 | Fourney et al. | |
| 9,315,341 B2 | 4/2016 | Leist | |
| 9,359,150 B2 | 6/2016 | Jodoin et al. | |
| 9,452,449 B2 | 9/2016 | Schroader | |
| 9,533,836 B2 | 1/2017 | Cristoforetti | |
| 9,624,043 B2 | 4/2017 | Koetje et al. | |
| 9,630,784 B2 | 4/2017 | Ragan | |
| 9,776,215 B2 | 10/2017 | Wargo | |
| 9,776,796 B2 * | 10/2017 | Tanz | B65G 15/24 |
| 9,845,203 B1 | 12/2017 | Cole et al. | |
| 9,878,854 B2 | 1/2018 | Walter et al. | |
| 10,202,243 B1 | 2/2019 | Lisso et al. | |
| 2003/0209407 A1 | 11/2003 | Brouwer et al. | |
| 2004/0129540 A1 | 7/2004 | Brixius et al. | |
| 2005/0115801 A1 * | 6/2005 | Holmgren | B65G 47/244 198/455 |
| 2006/0254880 A1 * | 11/2006 | Van Schaijk | B65G 47/766 198/370.08 |
| 2007/0176353 A1 | 8/2007 | Steinhuebel | |
| 2007/0221475 A1 | 9/2007 | Halsey | |
| 2007/0246328 A1 | 10/2007 | Reznik | |
| 2014/0262686 A1 * | 9/2014 | Schroader | B65G 47/682 198/455 |
| 2015/0122613 A1 | 5/2015 | Grant | |
| 2016/0046450 A1 | 2/2016 | Fourney | |
| 2016/0176653 A1 | 6/2016 | Grant | |
| 2017/0120300 A1 | 5/2017 | Schroader | |
| 2017/0173635 A1 | 6/2017 | Schroader | |
| 2018/0016100 A1 | 1/2018 | Axmann | |
| 2018/0079606 A1 | 3/2018 | Dwivedi | |
| 2018/0081346 A1 * | 3/2018 | Dwivedi | G05B 19/41865 |
| 2018/0093835 A1 | 4/2018 | Walter et al. | |
| 2018/0127215 A1 | 5/2018 | Axmann | |
| 2019/0077606 A1 | 3/2019 | Bogle | |

* cited by examiner

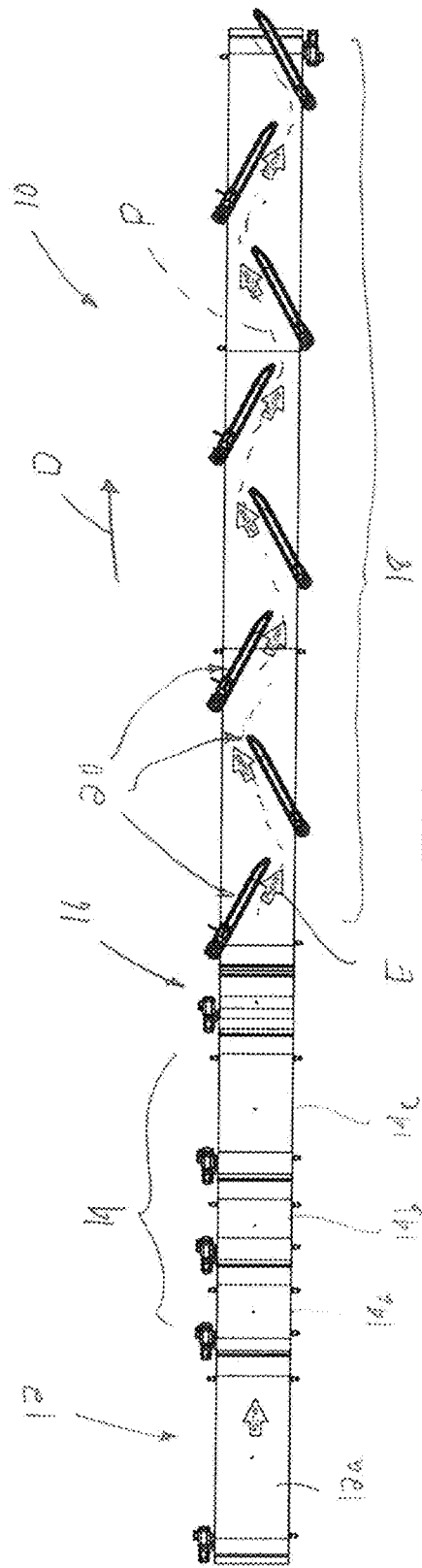

SORTATION SYSTEM AND RELATED METHODS

This application claims the benefit of U.S. Provisional Patent Application Ser. No. 62/694,678, the disclosure of which is incorporated herein by reference.

TECHNICAL FIELD

This disclosure relates to the article conveying arts and, in particular, to a sortation system including conveyors for conveying articles.

BACKGROUND

Over the past several years, the demand from businesses and individuals alike for second day and even overnight deliveries of articles, such as small to mid-sized parcels, packages and letters, has steadily increased. This demand is due, in part, to the prevalence of Internet and mail order shopping, which creates a similar need for an efficient and effective distribution system to deliver expediently the wares to a common carrier. Consequently, the need for methods and systems for quickly transporting, sorting and distributing this ever-increasing volume of articles has similarly increased.

Existing sortation systems all suffer from being extraordinarily complex. Known examples rely on staging conveyors that, in connection with "machine vision" scanners, attempt to characterize the articles being conveyed and implement control of the associated conveyors on this basis. While such systems may achieve the desired goal of singulation, the associated cost is high as a result of this complexity.

Thus, a need is identified for a simpler approach to article sortation and, in particular, singulation (that is, taking a random group of articles (potentially stacked) being conveyed and forming a single, unstacked row aligned with the conveying direction) to facilitate downstream processing. The approach would avoid the past need for characterizing the articles being conveyed as part of the sortation process, or attempting to independently control the conveyance of individual articles in order to achieve singulation.

SUMMARY

According to one aspect of the disclosure, a conveyor system for sorting articles being conveyed in a conveying direction is provided. The system comprises a first conveyor section comprising a plurality of inclined conveyors for destacking articles, a second conveyor section comprising at least one indexing conveyor for spacing a first group of articles from upstream articles, and a third conveyor section including a chicane conveying path for forming the first group of articles into a single row generally aligned with the conveying direction.

In one embodiment, an outfeed end of a first one of the plurality of inclined conveyors overlies an infeed end of a next-in-line one of the plurality of inclined conveyors. The at least one indexing conveyor may be adapted to operate at a higher speed than the plurality of inclined conveyors. The plurality of inclined conveyors may include a final conveyor in the first conveying section that is longer and higher at an exit point than the other inclined conveyors in the first conveying section.

The third conveyor section may comprise a plurality of powered belt diverters. More specifically, the third conveyor section may comprise at least one endless conveyor having a first conveying surface moving in a first conveying direction, and a plurality of powered belt diverters arranged above the first conveying surface for engaging articles thereon. Each powered belt diverter has a second conveying surface oriented transverse to the first conveying surface for conveying the articles in a second conveying direction different from the first conveying direction. A first powered belt diverter extends so as to provide a third conveying direction at a first angle relative to the first conveying direction, and a second powered belt diverter extends so as to provide a fourth conveying direction at a second angle relative to the first conveying direction. The third conveying direction created by the first angle and fourth conveying direction created by the second angle are generally in opposite directions (i.e., toward the right and toward the left).

The chicane conveying path may be generally S-shaped. The chicane conveying path may be formed by a plurality of diverters.

A further aspect of the disclosure pertains to a conveyor system for sorting articles being conveyed in a conveying direction. The system comprises a first conveyor section comprising a plurality of inclined conveyors for de-stacking articles, and a second conveyor section comprising a plurality of powered belt diverters for forming articles into a single row aligned with the conveying direction.

In one embodiment, the plurality of inclined conveyors includes a final conveyor in the first conveying section that is longer and higher at an exit point than the other inclined conveyors in the first conveying section. The system may further include a third conveyor section between the first conveyor section and the third conveyor section comprising at least one indexing conveyor for spacing a first group of articles from upstream articles. The second conveyor section may comprise at least one endless conveyor having a first conveying surface moving in a first conveying direction, the plurality of powered belt diverters arranged above the first conveying surface for engaging articles thereon, each of the powered belt diverters having a second conveying surface oriented transverse to the first conveying surface for conveying the articles in a second conveying direction different from the first conveying direction.

A first powered belt diverter extends so as to provide a third conveying direction at a first angle relative to the first conveying direction, and a second powered belt diverter extends so as to provide a fourth conveying direction at a second angle relative to the first conveying direction. The third conveying direction created by the first angle and fourth conveying direction created by the second angle are generally in opposite directions. The plurality of powered belt diverters may be arranged to create a generally S-shaped conveying path.

Still a further aspect of the disclosure is a conveyor system for sorting articles being conveyed in a conveying direction. The system comprises a first conveyor section comprising at least one indexing conveyor for spacing a first group of articles from upstream articles, and a second conveyor section comprising a plurality of powered belt diverters for forming the first group of articles into a single row aligned with the conveying direction. In one embodiment, the system further includes a third conveyor section comprising a plurality of inclined conveyors for destacking articles upstream of the first conveyor section.

Yet another aspect of the disclosure pertains to a conveyor system for sorting articles. The system comprises at least one endless conveyor having a first conveying surface moving in a first conveying direction, and a plurality of powered belt diverters arranged above the first conveying surface for engaging articles thereon, each having a second conveying surface oriented transverse to the first conveying surface for conveying the articles in a second conveying direction different from the first conveying direction.

In one embodiment, a first powered belt diverter extends so as to provide a third conveying direction at a first angle relative to the first conveying direction, and a second powered belt diverter extends so as to provide a fourth conveying direction at a second angle relative to the first conveying direction. The third conveying direction created by the first angle and fourth conveying direction created by the second angle are generally in opposite directions (i.e., left and right)

Still another aspect of this disclosure pertains to a conveyor system for sorting articles being conveyed in a conveying direction, comprising at least one conveyor having a first conveying surface moving in a first conveying direction, and a plurality of powered belt diverters arranged above the first conveying surface for engaging articles thereon, the plurality of powered belt diverters forming a chicane conveying path.

In one embodiment, the system includes a first powered belt diverter of the plurality of powered belt diverters that extends so as to provide a second conveying direction at a first angle relative to the first conveying direction. A second powered belt diverter of the plurality of powered belt diverters extends so as to provide a third conveying direction at a second angle relative to the first conveying direction. The second conveying direction created by the first angle and third conveying direction created by the second angle are generally in opposite directions.

A related aspect of the disclosure is a method for intended use in conjunction with the sorting of articles being conveyed in a conveying direction. The method comprises providing unstacked articles, spacing a first group of unstacked articles from upstream articles and, using a plurality of powered belt diverters, forming the first group of articles into a single row aligned with the conveying direction. The step of providing unstacked articles comprises de-stacking any stacked articles using a series of cascading conveyors.

BRIEF DESCRIPTION OF THE DRAWING FIGURES

Figure 4:
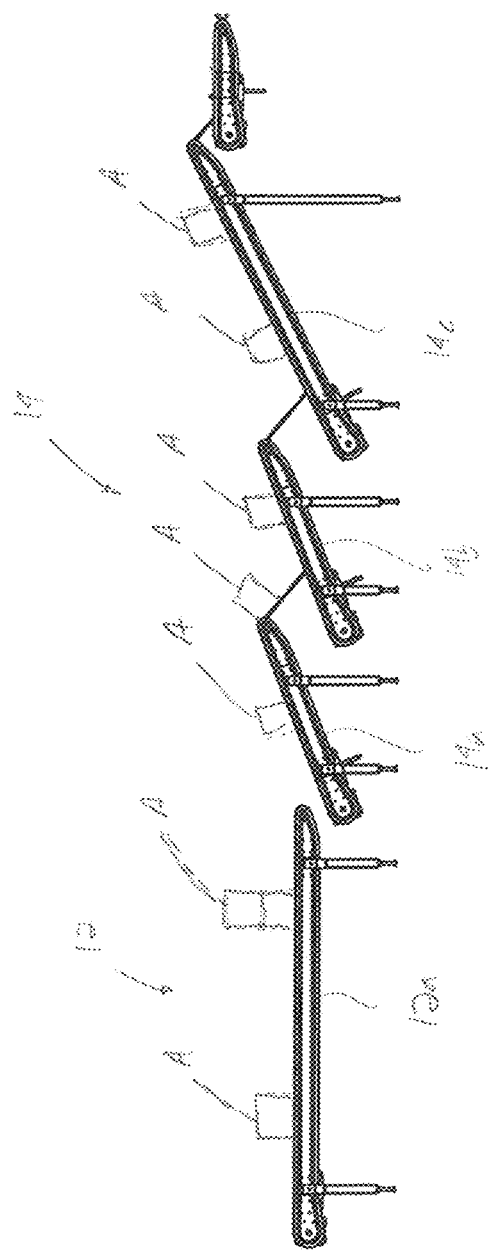
Figure 5:
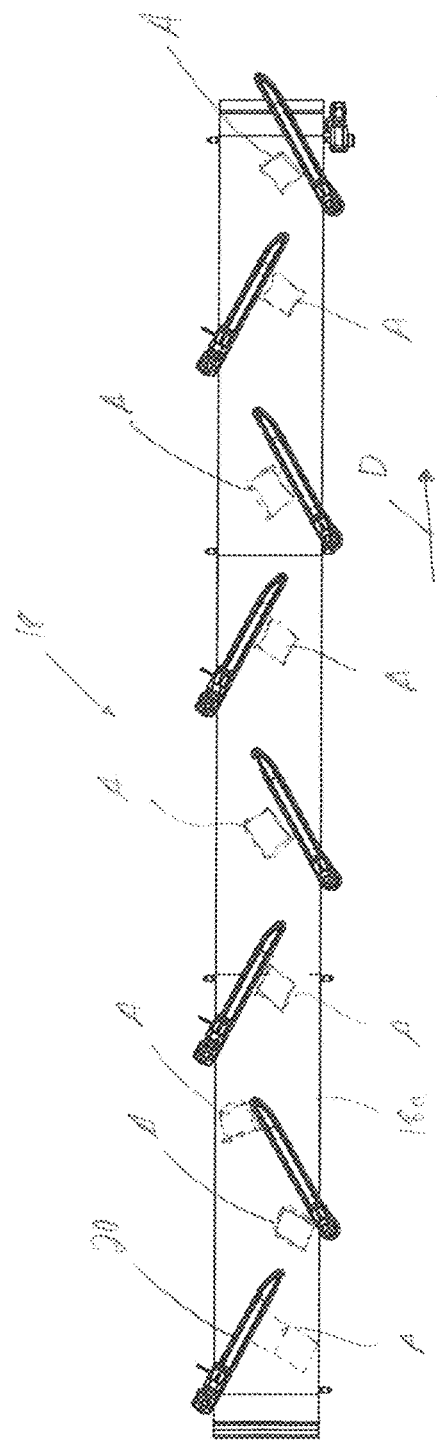

FIG. 1 is a top perspective view of a conveyor system according to the disclosure.
FIG. 2 is a top plan view of the conveyor system of FIG. 1.
FIG. 3 is a side view of the conveyor system of FIG. 1.
FIG. 4 is a side view of the part of the conveyor system.
FIG. 5 is a top view of part of the conveyor system.

DETAILED DESCRIPTION

With reference to FIGS. 1-3, one possible embodiment of a conveyor system 10 forming one aspect of the invention is schematically illustrated. As shown, the system 10 may comprise an infeed conveyor section 12 including at least one conveyor 12a for feeding articles to an intermediate conveyor section 14 comprised of a plurality of conveyors 14a . . . 14n, and an indexing section 16, including at least one indexing conveyor 16a, which in turn delivers the articles to an outfeed conveyor section 18, which includes one or more conveyors 18a . . . 18n for forming a single row of articles. Each successive conveyor/section 12, 14, 16, 18 may be of the endless belt or chain type, and thus provides a substantially continuous conveying surface for articles being conveyed. Although certainly not a requirement, a preference exists for the types of endless belt or chain conveyors manufactured and sold by Span Tech, LLC under THE DESIGNER SYSTEM® trademark, the details of which are found in U.S. Pat. Nos. 4,953,693 and 5,031,757 (which are incorporated herein by reference).

Articles or products enter the system 10 via the infeed conveyor 12a of infeed section 12 in a random orientation, and are occasionally arranged atop one another or stacked. To destack the articles, the intermediate conveyor section 14 comprises a series of cascading, or "waterfall," conveyors 14a . . . 14n. As perhaps best understood by FIG. 3, each conveyor 14a . . . 14n has an elevated or tilted orientation, and the outfeed end of an upstream conveyor 14a overlies the infeed end of the next-in-line conveyor 14b. This causes the articles being conveyed to tumble from one conveyor to the next (possibly along a static transfer 15), and thus serves to "destack" and separate the articles being conveyed.

Adjacent to the outfeed end of the last-in-line conveyor, which is labeled 14c in the appended figures, is an indexing conveyor 16a. This conveyor 16a is adapted to create a high acceleration for a group of products once received, which are generally in a horizontal row and aligned in a transverse direction. This acceleration helps to space the lead of products from any upstream ones, and thus helps to create a group for further downstream proceeding. The acceleration may be done in coordination with control of the speeds of the upstream conveyors 12a, 14a . . . 14n as well, in order to ensure that the desired level of separation is achieved (indeed, it is noted that the final "waterfall" conveyor 16c has a longer conveying surface to allow for it to delay/extend the time of delivery of articles to the indexing conveyor 16a).

The indexing conveyor 16a then delivers the articles in a group (again, generally a horizontal row) to the outfeed "descrambling" section 18, which comprises one or more generally co-planar conveyors 18a . . . 18n (three shown 18a, 18b, 18c), and a plurality of diverters or deflectors, which make take the form of "wall" conveyors in the form of arm-like powered belt diverters 20a . . . 20n. These diverters 20a . . . 20n are staggered in the conveying direction D, and arranged to create a chicane, or generally S-shaped conveying path P.

The elongated powered belt diverters 20a . . . 20b are oriented orthogonally to the conveying direction D, such that each associated belt or chain traverses: (1) an endless path that extends about a vertical axis V transverse to the conveying direction D; and (2) in a lateral direction E that is generally at an acute angle relative to the nominal conveying direction D of the underlying conveyor 18. In the particular embodiment shown, each successive powered belt diverter 20 is oriented to extend in an opposite direction relative to the preceding conveyor (that is, the first powered belt diverter extends at an acute angle relative to the nominal conveying direction D, and the second powered belt diverter extends at an acute angle in the opposite direction). The relative angular orientations of the powered belt diverters 20a . . . 20n may be adjustable and may vary in angle along the length of the outfeed section 18.

As a result, the horizontal row of articles is caused to be rearranged such that a single row generally aligned with the conveying direction D is formed. Specifically, the outermost article(s) on the row initially engage the first powered belt diverter 20a (FIG. 3), which may have a greater conveying speed that the underlying conveyor 18a, which thus advances these article(s) in the direction E and forms a line aligned with the conveying direction D. Successive iterations of this process along the outfeed section 18 serves to cause "singulation," such that the articles or products once passed through this section are spaced linearly in the conveying direction in an organized row, and are no longer side-by-side. The single row of articles created is thus oriented for being further processed (handled, scanned, routed to a particular destination, etc.), without the need to human intervention, and without the use of complicated machine vision/scanning technologies to assess the position of the articles on the conveyors and make corresponding speed adjustments in an effort to achieve singulation.

One example of an overall application of the sortation techniques described above is shown in FIGS. 4 and 5. In can be understood that in the first section 12, articles A on conveyor 12a are sometimes stacked, as indicated. Conveyors 14a, 14b, 14c in second section thus serve to de-stack the articles A, as indicated, and also introduce a spacing in the group of articles relative to upstream articles as a result of the acceleration created by one or more of these conveyors. The articles A then transfer to singulation section 18, where the powered belt diverters 20 engage the articles and create a single row in the conveying direction D. The result is that a randomly oriented, and possibly stacked arrangement of articles A is converted into a single row.

Each of the following terms written in singular grammatical form: "a", "an", and "the", as used herein, means "at least one", or "one or more". Use of the phrase One or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or, unless the context clearly dictates otherwise. For example, the phrases: "a unit", "a device", "an assembly", "a mechanism", "a component, "an element", and "a step or procedure", as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated components), feature(s), characteristic/\), parameters), integers), or step(s), and does not preclude addition of one or more additional components), feature(s), characteristics), parameters), integer(s), step(s), or groups thereof. Each of these terms is considered equivalent in meaning to the phrase "consisting essentially of. Each of the phrases "consisting of and "consists of, as used herein, means "including and limited to".

The phrase "consisting essentially of, as used herein, means that the stated entity or item (system, system unit, system sub-unit device, assembly, sub-assembly, mechanism, structure, component element or, peripheral equipment utility, accessory, or material, method or process, step or procedure, sub-step or sub-procedure), which is an entirety or part of an exemplary embodiment of the disclosed invention, or/and which is used for implementing an exemplary embodiment of the disclosed invention, may include at least one additional feature or characteristic" being a system unit system sub-unit device, assembly, sub-assembly, mechanism, structure, component or element or, peripheral equipment utility, accessory, or material, step or procedure, sub-step or sub-procedure), but only if each such additional feature or characteristic" does not materially alter the basic novel and inventive characteristics or special technical features, of the claimed item.

The term "method", as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Throughout this disclosure, a numerical value of a parameter, feature, characteristic, object or dimension, may be stated or described in terms of a numerical range format. Such a numerical range format, as used herein, illustrates implementation of some exemplary embodiments of the invention, and does not inflexibly limit the scope of the exemplary embodiments of the invention. Accordingly, a stated or described numerical range also refers to, and encompasses, all possible sub-ranges and individual numerical values (where a numerical value may be expressed as a whole, integral, or fractional number) within that stated or described numerical range. For example, a stated or described numerical range from 1 to 6 also refers to, and encompasses, all possible sub-ranges, such as from 1 to 3, from 1 to 4, from 1 to 5, from 2 to 4, from 2 to 6, from 3 to 6, etc., and individual numerical values, such as "1.3", "2, "2.8", "3", "3.5", "4", "4.6", "5", "5.2", and "6", within the stated or described numerical range of from 1 to 6. This applies regardless of the numerical breadth, extent or size, of the stated numerical range.

Moreover, for stating or describing a numerical range, the phrase "in a range of between about a first numerical value and about a second numerical value", is considered equivalent to, and meaning the same as, the phrase "in a range of from about a first numerical value to about a second numerical value", and, thus, the two equivalents meaning phrases may be used interchangeably. For example, for stating or describing the numerical range of room temperature, the phrase "room temperature refers to a temperature in a range of between about 20° C. and about 25° C.," and is considered equivalent to, and meaning the same as, the phrase "room temperature refers to a temperature in a range of from about 20° C. to about 25° C."

Terms of approximation, such as the terms about, generally, substantially, approximately, etc., as used herein, refers to ±10% of the stated value or condition, or otherwise as close to the condition as possible, save for tolerances or minor variations.

The phrase "operatively connected", as used herein, equivalently refers to the corresponding synonymous phrases "operatively joined", and "operatively attached," where the operative connection, operative joint or operative attachment, is according to a physical, or/and electrical, or/and electronic, or/and mechanical, or/and electro-mechanical, manner or nature, involving various types and kinds of hardware or/and software equipment and components.

It is to be fully understood that certain aspects, characteristics, and features, of the invention, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the invention which are illustratively described and presented in combination or sub-combination in the context or format of a single embodiment may also be illustratively described and presented in the context or format of a plurality of separate embodiments.

Although the invention has been illustratively described and presented by way of specific exemplary embodiments, and examples thereof, it is evident that many alternatives, modifications, or/and variations, thereof, will be apparent to those skilled in the art Accordingly, it is intended that all such alternatives, modifications, or/and variations, fall within the spirit of, and are encompassed by, the broad scope of the appended claims.

The invention claimed is:

1. A conveyor system for sorting articles being conveyed in a conveying direction, comprising:
a first conveyor section comprising a plurality of inclined conveyors for de-stacking articles;
a second conveyor section comprising at least one indexing conveyor for spacing a first group of articles from upstream articles; and
a third conveyor section including a chicane conveying path for forming the first group of articles into a single row generally aligned with the conveying direction, wherein the plurality of inclined conveyors includes a final conveyor in the first conveyor section that is longer and higher at an exit point than the other inclined conveyors in the first conveyor section.

2. The conveyor system of claim 1, wherein an outfeed end of a first one of the plurality of inclined conveyors overlies an infeed end of a next-in-line one of the plurality of inclined conveyors.

3. The conveyor system of claim 1, wherein the at least one indexing conveyor is adapted to operate at a higher speed than the plurality of inclined conveyors.

4. The conveyor system of claim 1, wherein the third conveyor section comprises a plurality of powered belt diverters.

5. The conveyor system of claim 1, wherein the third conveyor section comprises:
at least one endless conveyor having a first conveying surface moving in a first conveying direction; and
a plurality of powered belt diverters arranged above the first conveying surface for engaging articles thereon, each having a second conveying surface oriented transverse to the first conveying surface for conveying the articles in a second conveying direction different from the first conveying direction.

6. The conveyor system of claim 5, wherein a first powered belt diverter extends so as to provide a third conveying direction at a first angle relative to the first conveying direction, and a second powered belt diverter extends so as to provide a fourth conveying direction at a second angle relative to the first conveying direction.

7. The conveyor system of claim 6, wherein the third conveying direction created by the first angle and fourth conveying direction created by the second angle are generally in opposite directions.

8. The conveyor system of claim 1, wherein the chicane conveying path is generally S-shaped.

9. The conveyor system of claim 1, wherein the chicane conveying path is formed by a plurality of diverters.

10. A conveyor system for sorting articles being conveyed in a conveying direction, comprising:
a first conveyor section comprising a plurality of inclined conveyors for de-stacking articles; and
a second conveyor section comprising a plurality of powered belt diverters for forming articles into a single row aligned with the conveying direction, wherein the plurality of inclined conveyors includes a final conveyor in the first conveyor section that is longer and higher at an exit point than the other inclined conveyors in the first conveyor section.

11. The conveyor system of claim 10, further including a third conveyor section between the first conveyor section and the second conveyor section comprising at least one indexing conveyor for spacing a first group of articles from upstream articles.

12. The conveyor system of claim 11, wherein the second conveyor section comprises at least one endless conveyor having a first conveying surface moving in a first conveying direction, the plurality of powered belt diverters arranged above the first conveying surface for engaging articles thereon, each of the powered belt diverters having a second conveying surface oriented transverse to the first conveying surface for conveying the articles in a second conveying direction different from the first conveying direction.

13. The conveyor system of claim 12, wherein a first powered belt diverter extends so as to provide a third conveying direction at a first angle relative to the first conveying direction, and a second powered belt diverter extends so as to provide a fourth conveying direction at a second angle relative to the first conveying direction.

14. The conveyor system of claim 12, wherein the third conveying direction created by the first angle and fourth conveying direction created by the second angle are generally in opposite directions.

15. The conveyor system of claim 10, wherein the plurality of powered belt diverters are arranged to create a generally S-shaped conveying path.

16. A conveyor system for sorting articles being conveyed in a conveying direction, comprising:
a first conveyor section comprising at least one indexing conveyor for spacing a first group of articles from upstream articles; and
a second conveyor section comprising at least one endless conveyor and a plurality of powered belt diverters for forming the first group of articles into a single row aligned with the conveying direction, wherein the plurality of powered belt diverters are adapted to operate at a higher conveying speed than the at least one endless conveyor.

17. The conveyor system of claim 16, further including a third conveyor section comprising a plurality of inclined conveyors for destacking articles upstream of the first conveyor section.

18. A conveyor system for sorting articles, comprising:
at least one endless conveyor having a first conveying surface moving in a first conveying direction; and
a plurality of powered belt diverters arranged above the first conveying surface for engaging articles thereon, each having a second conveying surface oriented transverse to the first conveying surface for conveying the articles in a second conveying direction different from the first conveying direction, wherein a first powered belt diverter extends so as to provide a third conveying direction at a first angle relative to the first conveying direction, and a second powered belt diverter extends so as to provide a fourth conveying direction at a second angle relative to the first conveying direction, and wherein the plurality of powered belt diverters are adapted to operate at a higher conveying speed than the at least one endless conveyor.

19. The conveyor system of claim 18, wherein the third conveying direction created by the first angle and fourth conveying direction created by the second angle are generally in opposite directions.

20. A conveyor system for sorting articles being conveyed in a conveying direction, comprising:
- at least one conveyor having a first conveying surface moving in a first conveying direction; and
- a plurality of powered belt diverters arranged above the first conveying surface for engaging articles thereon, the plurality of powered belt diverters forming a chicane conveying path, wherein the plurality of powered belt diverters are adapted to operate at a higher conveying speed than the at least one conveyor.

21. The system of claim 20, wherein:
- a first powered belt diverter of the plurality of powered belt diverters diverts the articles in a second conveying direction at a first angle relative to the first conveying direction; and
- a second powered belt diverter of the plurality of powered belt diverters diverts the articles in a third conveying direction at a second angle relative to the first conveying direction, the second conveying direction created by the first angle and third conveying direction created by the second angle being in generally opposite directions.

22. A method for intended use in conjunction with the sorting of articles being conveyed in a conveying direction, comprising:
- providing unstacked articles, wherein the step of providing unstacked articles comprises de-stacking any stacked articles using a series of cascading conveyors, and wherein the series of cascading conveyors includes a final conveyor that is longer and higher at an exit point than any other conveyor of the series of cascading conveyors;
- spacing a first group of unstacked articles from upstream articles; and
- using a plurality of powered belt diverters, forming the first group of articles into a single row aligned with the conveying direction.

* * * * *